G. O. DEGENER.
COMBINED TYPE WRITING AND COMPUTING MACHINE.
APPLICATION FILED MAR. 12, 1913.

1,271,288.

Patented July 2, 1918.
4 SHEETS—SHEET 1.

Witnesses
J. H. Brophy
F. E. Alexander

Inventor
Gustave O Degener
By D. C. Stickney
Attorney

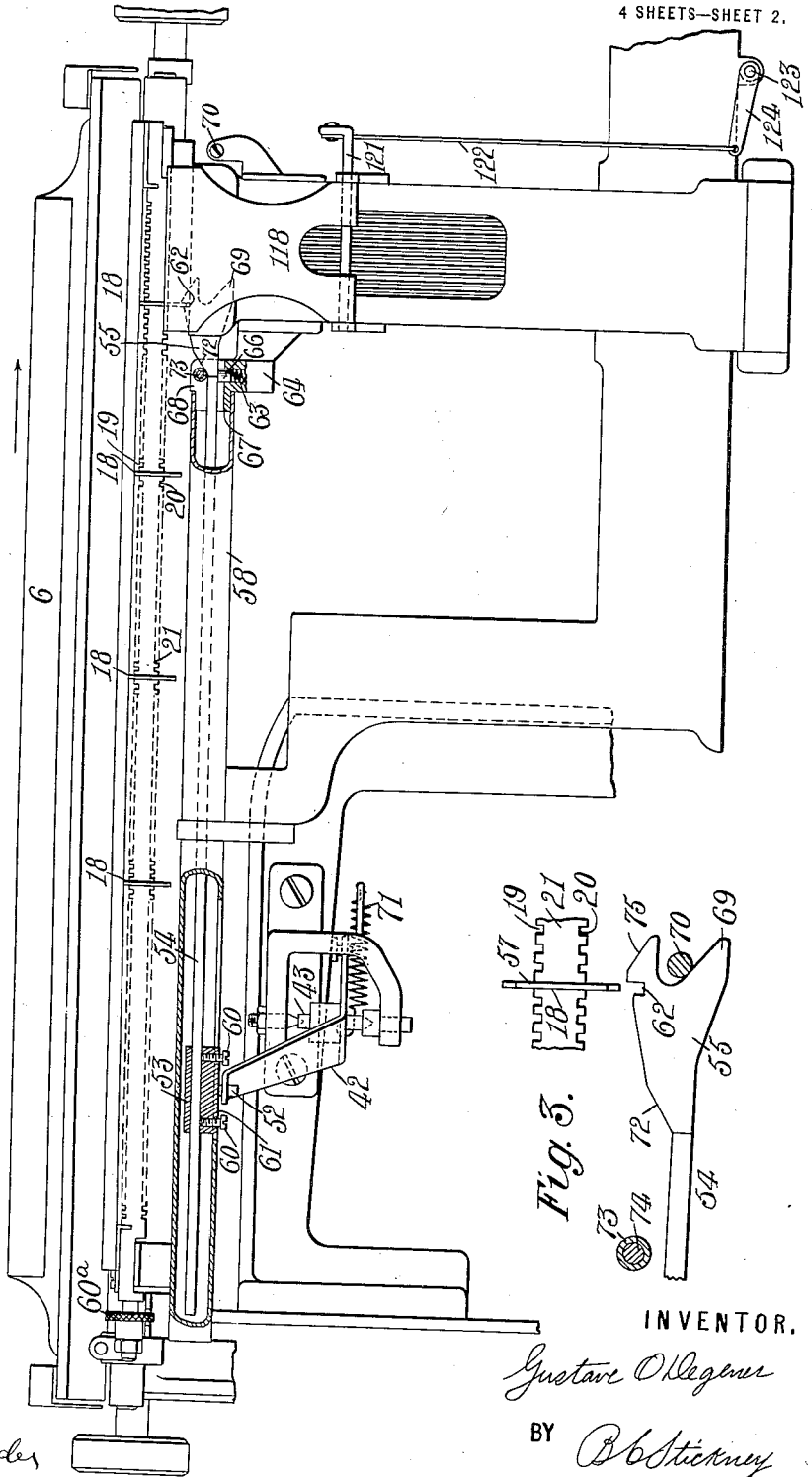

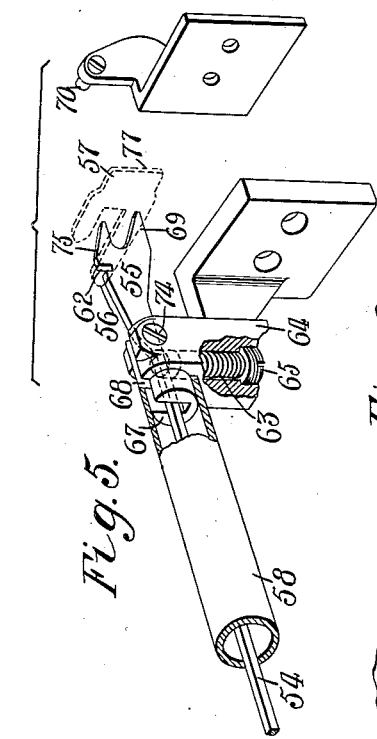

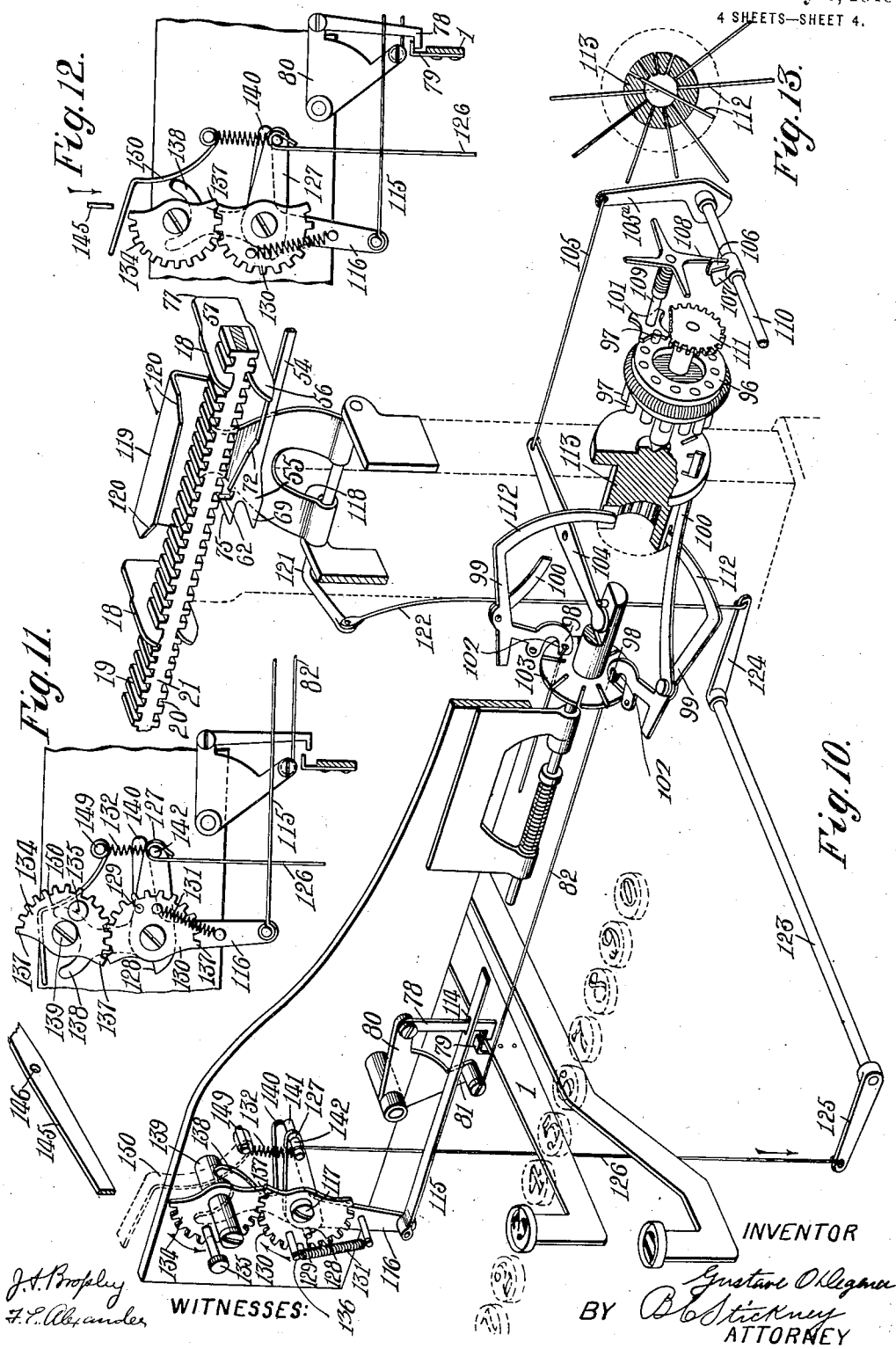

UNITED STATES PATENT OFFICE.

GUSTAVE O. DEGENER, OF NEW YORK, N. Y., ASSIGNOR TO UNDERWOOD COMPUTING MACHINE COMPANY, OF NEW YORK, N. Y., A CORPORATION OF NEW YORK.

COMBINED TYPE-WRITING AND COMPUTING MACHINE.

1,271,288.  Specification of Letters Patent.  Patented July 2, 1918.

Application filed March 12, 1913. Serial No. 753,660.

*To all whom it may concern:*

Be it known that I, GUSTAVE O. DEGENER, a citizen of the United States, residing in New York city, in the county of New York and State of New York, have invented certain new and useful Improvements in Combined Type-Writing and Computing Machines, of which the following is a specification.

My invention relates to combined typewriting and computing machines, and is especially directed to mechanism for disconnecting the keys and carriage from the computing mechanism.

The invention is herein disclosed as an improvement on Patent No. 1,244,398, dated October 23, 1917, wherein is disclosed a combined typewriting and computing machine of the Underwood-Wright type. In said patent, the computing wheels are grouped in a totalizer, and are arranged to be operated *seriatim* by a master wheel which is power-driven. In said patent the master wheel itself is part of a computing machine carriage, while the computing wheels are mounted in a stationary totalizer, and said master wheel is adapted to be intermittently connected to the traveling carriage of the typewriter by means of stops which may be set at any desired positions on the ordinary tabulating rack bar of the typewriter. The stops may be connected to move the master wheel by means of a cross lever pivoted intermediate its ends so that when the carriage is traveling in one direction, it moves the master wheel in the opposite direction.

The drawings show certain improvements covered by the patent to Wright and Degener, No. 1,237,008, dated Aug. 14, 1917, wherein the numeral keys are normally free from the computing mechanism, but may be connected thereto so as to control said mechanism by means of hooks, there being one hook for each numeral key.

According to the present invention, said connection may be made effective either by a manually settable key or by a lever automatically moved by the traveling carriage of the typewriter.

According to the present invention, as applied to the Underwood-Wright combined typewriting and computing machine, the lever which moves the links so as to connect the keys to the computing mechanism is automatically moved by stops, preferably tabulating stops as disclosed in my Patent No. 1,247,379, dated Nov. 20, 1917, and the same stops are arranged to simultaneously connect the computing machine carriage to the typewriter carriage, so that the two travel step by step together. The platen shift mechanism may be arranged to disconnect the numeral keys from the computing mechanism, thus preventing the computation of a number when an upper case character is being written. The computing mechanism preferably includes a device for preventing the simultaneous operation of more than one numeral key, and said device may be connected to the keys through said links, so that when said links are in their ineffective position, the numeral keys are completely clear not only of the computing mechanism proper, but also of the auxiliary devices connected thereto.

Other features and advantages will hereinafter appear.

In the accompanying drawings,

Fig. 2 is a rear elevation of the machine.

Fig. 3 illustrates the manner of automatically disconnecting the traveling members of the computing mechanism from the typewriter carriage.

Fig. 4 is a sectional plan of a portion of the computing mechanism which is involved in the present invention.

Fig. 5 is a perspective view of one of the hooks and its appurtenances.

Fig. 6 is a sectional view showing the hook in cross section, and also the spring by which it is lifted to connect it with the typewriter carriage.

Figs. 7, 8 and 9 show different forms of stops or blades to be inserted in the tabulator rack for calculating and cross adding.

Fig. 10 is a skeleton perspective showing how the carriage controls the connections between the numeral keys and the computing mechanism.

Fig. 11 is a detail of Fig. 10, showing the parts in another position.

Fig. 12 is similar to Fig. 11, but showing the parts in still another position, so that the numeral keys are connected to the computing mechanism.

Fig. 13 is a section showing the operation of the key-interfering device.

Figure 1:
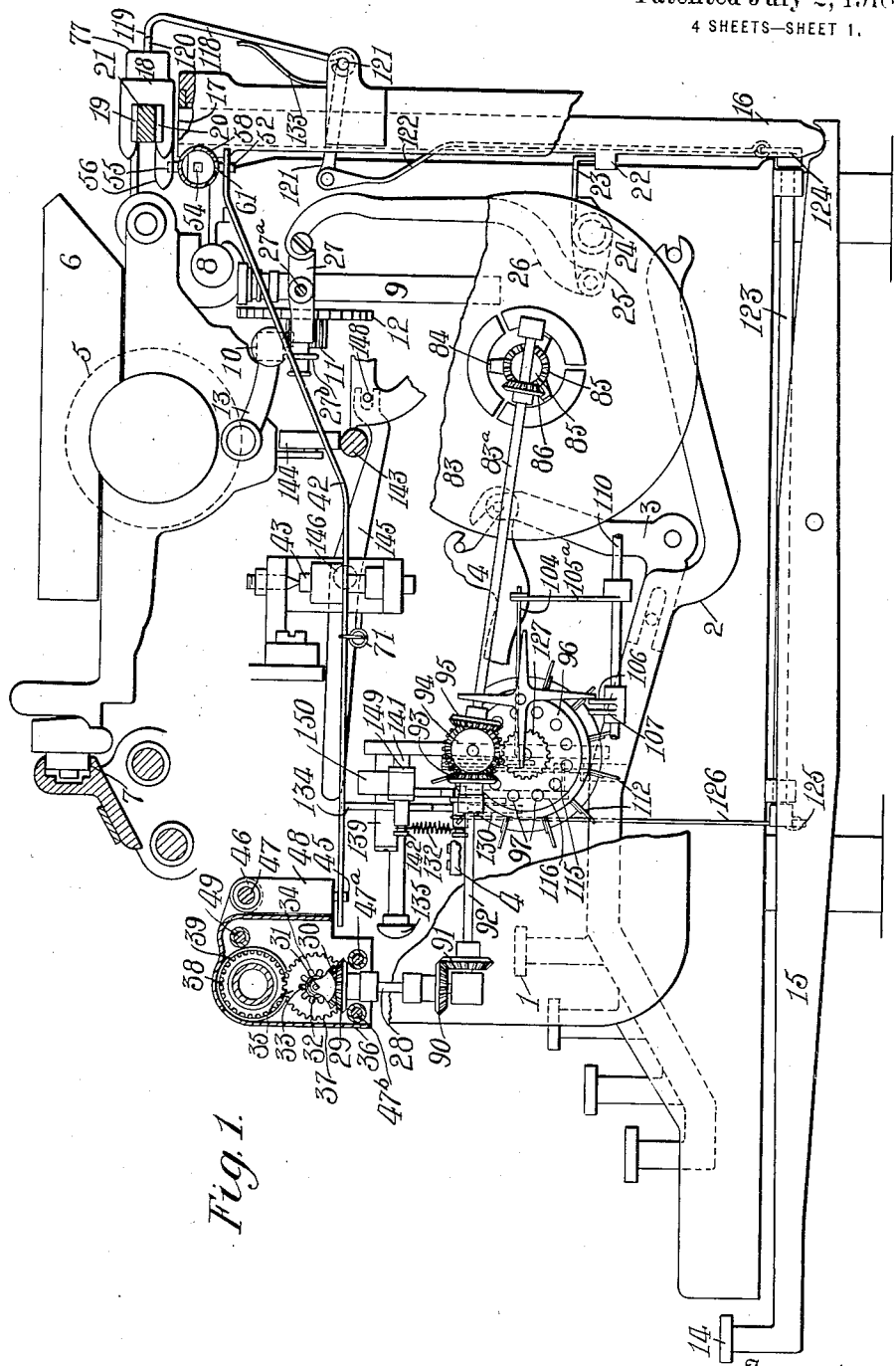
Figure 1 is a sectional elevation from front to rear, showing the present improvements applied to an Underwood front strike combined typewriting and computing machine.

In the Underwood machine, numeral keys 1 depress levers 2 to vibrate bell cranks 3, and swing type bars 4 up to strike rearwardly against the front side of a platen 5. Said platen is mounted on a carriage 6, running on tracks 7, 8, and is driven by a spring barrel 9, and also has a rack 10 meshing with a pinion 11 connected to an escapement wheel 12, the escapement dogs, which are operated at every key stroke, being omitted. The rack 10 is hung on arms 13, so that it may be lifted from the pinion 11 to release the carriage.

Tabulator keys 14 are mounted upon levers 15, which, at their rear ends, raise the stop rods 16, having decimal stops 17 at their upper ends. These stops may coöperate with interchangeably adjustable column stops 18, Fig. 8, of the ordinary type; said column stops being inserted, as required, in notches 19, 20, formed in the top and bottom of a bar 21, which is fixed to the carriage 6.

Each decimal stop-rod has a shoulder 22 coöperating with a universal bar 23, which rocks about a pivot 24, and has an arm 25, which draws down a link 26 and vibrates a lever 27, the latter fulcrumed at 27ª and carrying a roll 27ᵇ to run upon the under side of the rack bar 10, and lift the latter from the escapement pinion 11, whenever a key 14 is depressed. As so far described in detail, the parts are in common use on said Underwood typewriting machine.

The computing mechanism includes a drive shaft 28, having a bevel pinion 29 meshing with a pinion 30 upon a square shaft 31, the latter having splined to it a master wheel 32, which moves along the shaft and has spurs or teeth 33 to engage an internal set of teeth 34 formed upon a gang of computing wheels 35. These wheels 35 are mounted in a casing 36 and also have exterior teeth 37 to mesh with gears 38, connected to number wheels 39. The master wheel 32 is swiveled in a traveling hollow mandrel or arbor 40, within which the master wheel shaft 31 may project, the swivel-joint being shown at 41, and permitting the master wheel 32 to be rotated by the shaft 31, while said master wheel is caused to travel in axial direction by the mandrel or arbor 40.

The mechanism so far described forms no part of the present invention, and the drive shaft 28 may be driven and controlled either directly by the numeral keys 1 or in any other suitable manner, as by a motor, as is hereinafter described. The shaft 28, it will be understood, is rotated automatically upon the depression of any of the numeral keys 1, the extent of rotation depending upon which key is depressed.

The mandrel 40 is moved endwise by means of a forwardly and rearwardly extending lever 42, pivoted midway of its ends by means of gudgeons 43, so as to swing in a horizontal plane. At its forward end the lever is slotted at 44 to engage a pin 45 projecting from the carriage which carries the mandrel 40; said carriage comprising a tube 46 sliding upon a fixed rod 47, and also an arm 48, sliding upon a fixed horizontal rod 49; the mandrel 40 being secured to the forward end of the arm 48 by means of a set screw 50. The movement of the mandrel 40 is of course only sufficient to enable the master-wheel 32 to travel the length of the gang of computing wheels 35, one of which is provided for each number wheel 39. The rod 47 coöperates with two similar rods or studs 47ª and 47ᵇ, all projecting from a framework plate or bracket 47ᶜ, to carry a small plate 47ᵈ, which also supports the end of rod 49. It will be seen that the rods or studs 47ª and 47ᵇ, Fig. 1, carry the casing 36.

At its rear end, the lever 42 has a slot 51 to engage a pin 52 projecting down from a slide 53, the latter carrying the stem 54 of a hook 55, adapted to engage lugs 56 formed upon said stops 18 or upon blades 57 which are forked to fit into the notches 19, 20, in the rack or bar 21, for connecting the paper carriage 6 to the master wheel 32 to cause the latter to travel step by step with the paper carriage.

The slide 53 works in a tubular guide or housing 58, which is slotted on its under side at 59 to permit the pin 52 to pass down to the lever 42. The stem 54 of the hook 55 passes through a longitudinal perforation in the slide 53, and is adjustably secured to the latter by set screws 60, Fig. 2. This permits slight longitudinal adjustment of the hook in order to enable the master wheel 32 to be adjusted properly relatively to the computing wheels 35 while the hook is engaged by one of the lugs 56. The rack 21 has at 60ª the usual provision for longitudinal adjustment. The slide 53 has a feather 61, to fit into the slot 59, to prevent the slide and the hook from turning in the tube 58.

The hook has a notch 62 to enable it to engage any of the lugs 56. The hook normally springs up to engage the adjacent lug. For this purpose the hook may be made resilient or flexible, and a compression spring 63 may be employed to aid or cause the upward movement of the hook; said spring being housed in a boss 64, and confined by a screw 65, and pressing a plunger 66 up against a straight portion of the under side of the hook, thus holding the latter up while permitting it to move freely endwise. The boss 64 is formed on a bushing 67, which is vertically slotted at 68 to form a guide for the hook; said bushing serving as a plug to close this end of the tubular housing 58.

When the hook is in engagement with one of said lugs 56, it is carried with the paper carriage 6 in the direction of the arrow at Fig. 2, that is, to the right to cause the lever 42 to swing upon its pivot and thereby drive the mandrel 40 and the master wheel 32 to the left at Fig. 4. As the keys 1 are operated to write figures in the column, the master wheel 32 is correspondingly rotated, in any usual or suitable manner, to rotate the corresponding computing wheels 35. When the master wheel has advanced past the computing wheel 35 of lowest denomination, a cam 69 formed on the hook 55 engages a projection 70 fixed upon the framework of the machine, and is thereby forced downwardly, to withdraw the hook 55 from that lug 56 with which it has been in engagement. As soon as the hook is released, a returning spring 71 connected to the lever 42 swings the latter in the opposite direction, carrying the master wheel 32 backwardly or to the right at Fig. 4, that is, toward the computing wheel 35 of highest denomination; this movement continuing until the hook 55 engages the succeeding lug 56, said hook being pressed up to engage said lug by means of the spring 63, so as to become fully seated in the notch 62, as at Fig. 5. The writing of the number in the succeeding column will now proceed, and said number will be accumulated on said computing wheels by the number wheels 39, in the manner already referred to.

When returning the carrier 6 to begin a new line of writing, if the hook 55 is in engagement with one of the lugs 56, it is carried to the left at Fig. 2, until a cam edge 72 thereon strikes a stud or roller 73, which may be pivoted upon a screw 74, threaded into the top of the boss 64; and by means of said roller or obstruction, the hook is cammed downwardly and released from the lug 56. The spring 63 immediately lifts the hook again, and the lugs 56 in succession ride freely over a bevel or point 75 formed on the tip of the hook; the last lug in the series being caught and held by the hook when the carriage begins to run in letter-feeding direction.

At Fig. 8, the lug 56 is shown in the form of a continuation or extension of the lower of the two prongs seen at Fig. 9, and hence this blade 57 may be used for both tabulating purposes, in connection with the keys 14, and for connecting the master wheel 32 to the paper carriage 6, at the proper point in the travel of the latter to enable the number written in the selected column to be added upon the corresponding computing wheels 35.

At Fig. 9 is illustrated the usual Underwood column-stop, without the extension 56. This stop may, of course, be placed in the rack 21 in the usual manner, and without the capability of engagement by the hook 55; as it may be sometimes desired to write a column of names or other items when it is not desired to compute.

At Fig. 7 is shown a blade $57^a$, having a notch $57^b$ opposite the decimal stops 17; and it will be seen that these blades may be set at such points along the rack 21 as desired to connect the master wheel 32 to the paper carriage 6, regardless of the operation of the tabulating mechanism. It will be understood that all three kinds of blades 18, 57, and $57^a$ may be employed at the same time on the rack 21; or only two kinds of blades, as $57^a$ and 18, may be used in some cases. The endwise adjustment of stem 54 enables the hook to be readily adjusted for either Fig. 8 or Fig. 7 form of blade, the Fig. 9 stop being, of course, set the proper distance from blade 57, say one or two letter-spaces.

It will thus be seen that the master wheel 32 may be connected up to the paper carriage 6 by a very simple mechanism, without the necessity of providing an additional rack to carry the lugs that engage with the hook 55; the lever 42 conveniently connecting the master-wheel, which is at the front of the machine, with the hook 55 which engages the lugs 56 on the rack 21, which, in the Underwood typewriter, is placed at the rear of the machine.

The blades 57 which carry the extensions 56 are provided with rearward tappets 77, and said tappets are arranged to connect the numeral keys 1 to the computing mechanism whenever the master wheel is carried into engagement with the computing wheels 35, said numeral keys being normally disconnected from the computing mechanism. To bring about this result, there is provided for each numeral key 1 a hook 78 which may be swung so as to underlie a lug 79 fast on its numeral key lever.

Whenever said key lever is depressed, the hook 78 will be drawn downward, and swing the bell crank 80 to which it is fast so that an arm 81 on said bell crank will draw on a link 82 extending to the computing mechanism proper, and cause a motor 83 to turn the master wheel 32 to an extent determined by the numeral key then operated. The motor 83 is constantly running, and tends to turn the shaft $83^a$, to which it is geared, by means of a slip clutch 84 carrying a pinion 85 meshing with a bevel gear 86 on the shaft $83^a$. Said shaft $83^a$ is normally held from turning, but whenever a numeral key 1 draws on its link 82, said link operates a computing machine escapement mechanism or indexing device, which permits said shaft to turn, and in turning, the master wheel 32 is turned by said shaft through the previously mentioned bevel gear 30 fast on the master wheel shaft 31, said bevel gear meshing with the bevel gear 29 on the upright shaft 28. This upright shaft has also fast on it a bevel gear 90 meshing with a bevel gear 91 on a horizontal shaft 92, said horizontal shaft carrying a bevel gear 93 in mesh with a bevel gear 94 fast to a shaft of the escapement mechanism and meshing with a bevel gear 95 fast on the drive shaft 83ª.

The computing escapement mechanism includes a primary escapement wheel 96 in which are mounted settable pins 97, as described in said Patent No. 1,237,008, and whenever a numeral key draws on its link 82, said link pulls an arm 98 of a bell crank 99, so that a jack 100 pivoted on the other arm of said bell crank strikes a pin 97 on said escapement wheel 96 and projects it. Said escapement wheel is normally prevented from revolving by means of a previously projected pin 97, as shown in Fig. 10, which bears against one arm of a star wheel 101. Whenever a numeral key is depressed, as has been described, and draws on its link 82, said star wheel 101 is permitted to revolve, thus releasing the escapement wheel 96, which turns freely until the just projected pin 97 comes against the star wheel 101. For permitting the star wheel thus to turn, each link 82, when operated by its numeral key, causes a head 102 on the bell crank 99 to draw against a universal disk 103, thereby swinging a lever 104, so as to thrust on a link 105 and, by means of an arm 105ª, rock the dogs 106 and 107 fast on a shaft 110, one of which dogs holds one tooth of a four-toothed wheel 108 fast on the shaft 109 of the star wheel 101. In its normal position, the wheel 108 has a tooth which bears against the dog 106, thus locking the star wheel 101 against rotation, and holding the primary escapement wheel 96 by its projected pin 97. Whenever a numeral key is depressed, as above described, it rocks said dog 106 so as to permit the tooth 108 which has been bearing against said dog to escape past said dog 106, so that it is caught by the dog 107. As the numeral key rises, the shaft 110 which carries said dogs is rocked back to its normal position, thus allowing the tooth 108 which has been bearing against said dog 107 to escape past said dog, and the star wheel 101 will turn until the next tooth 108 strikes the dog 106, which is now in position to arrest any tooth 108. Thus the rocking of the dogs 106, 107, permits the primary escapement wheel 96 to turn until the pin projected by the numeral key just operated arrests said escapement wheel by striking the tooth of the star wheel 101. The projected pin 97 which has been holding said primary escapement wheel against operation is returned to normal position by means of a cam, not shown herein. The escapement wheel 96 has fast on its shaft a gear wheel 111 which meshes with a gear wheel fast on the shaft of the wheel 94 which has been above described as constantly tending to turn under the torque of the slip clutch 84.

Whenever any numeral key is operated, as above described, so as to draw on its link 82 and swing the bell crank 99 to operate the jack 100, it also swings a blade 112, forming an extension of said bell crank, across a slotted cylinder 113. Said blades 112 are utilized to prevent the operation of any numeral key until the operation of any other numeral key is completed. For this purpose said blades are arranged to extend radially across said cylinder 113, with the result, as seen in Fig. 13, that if any blade 112 stands projected across the axis of said cylinder, no other blade can be moved across said axis.

The hooks 78 have been described as being operated by the numeral keys. Said hooks, however, may be swung to positions where they are either effective or ineffective with reference to the numeral keys. For this purpose all said hooks pass through openings 114 in a single bar 115 which may be shifted laterally of the typewriting machine so as to move all said hooks under the lugs 79, or move them all clear of said lugs. It will be obvious that when said hooks are clear of said lugs 79, the numeral keys will be free of the load of operating the computing escapement mechanism as well as all the auxiliary parts, such as the blades 112.

Said bar 115 is automatically settable, so that it will hold said hooks effective or ineffective. For this purpose, said bar 115 is pivoted at its end to a lever 116 pivoted at 117. Said lever 116 is swung to carry the hooks 78 clear of the computing wheels by the extension 77 on the blades 57. The connections for doing this include a control arm 118 pivoted on the frame carrying the tabulator plungers 16, on the upper end of which arm is a bent-over cam plate 119 beveled at its ends 120 so that by the travel of the typewriter carriage the tappet 77 will, as it moves along, strike the cam 119 and move it outwardly by pressing against the bevel face 120. This causes a rock arm 121 fast to the control arm 118 to draw on a link 122, thereby rocking a rock shaft 123 by an arm 124, so that a second arm 125 on said shaft draws down a link 126 pivoted to an arm 127, said arm at its opposite end having a notch 128 which strikes a pin 129 on the segment 130, thereby swinging said segment so as to draw on a spring 131 fast to the segment and pull the lever 116, to which said spring is anchored. This moves the bar 115, so that it carries the hooks 78 to their effective position. The arm 127 is normally drawn upwardly by means of a spring 132, which tends to rock the arm 118 inwardly, and said arm is prevented from being swung in too far by means of a spring 133, which bears against it (Fig. 1).

The bar 115 may have its connections to the arm 118 so set that said arm will be ineffective to connect the hooks 78 to the numeral keys 1. For this purpose the segment 130 may be swung so as to carry the spring 131 where it will draw the lever 116 and bar 115 in the opposite direction. Said segment may be so swung by means of a second idle segment 134, meshing therewith, and carrying a handle 135 by which it may be rotated, so as to rotate the segment 130 through part of a revolution, carrying the pin 136 thereon, to which the spring 131 is anchored to the opposite side of the pivot 117 on which said segment is journaled. When in this position, as seen in Fig. 11, the pin 129 at the back of said segment which engages the arm 127 is carried to such a position that it no longer engages said arm, and consequently when said arm 127 is moved by the control arm 118 it moves idly, that is to say, the hooks 78 remain free of the numeral keys. The segments 130 and 134 are prevented from being overthrown and carried out of mesh by their end teeth 137 which are oversize and consequently lock against each other.

The lever 116 is extended upwardly to form a yoke 138 which has arms extending on each side of the pivot 139 on which the segment 134 is journaled, so that said arms will limit the throw of said lever 116. Said lever also comprises an arm 140 which is arranged to strike the rearward extension 141 of the pin 142 by which the link 126 is joined to the arm 127, thus holding the lever 116 so that it moves almost positively with the arm 127, since said arm 127 has the pin 129 bearing against it on one side of its pivot, and the pin 142 bearing against it on the opposite side of its pivot.

The above connections, it will be noted, provide means by which the numeral keys may be disconnected entirely from the computing mechanism so that the typewriter may be used as a typewriting machine without the labor of operating any of the computing parts. This is done by merely operating the handle or finger piece 135. When said finger piece is set so that the computing mechanism is connected to the numeral keys of the typewriter, the computing mechanism will do cross addition in any number of columns, which columns may be set by the mere adjustment of tabulating stops 18 of the proper character, while other tabulating stops may be set which will have no effect on the computing mechanism, but yet will position the carriage by coöperating with the tabulating keys. It will also be noted that the numeral keys are completely free of the computing mechanism in the spaces between the columns in which computing is being done.

Means are also provided for connecting the platen shift mechanism to the hooks 78 in such a way that whenever the platen is shifted to write in the upper case, the keys will be moved free of the numeral keys.

As shown in my Patent No. 1,256,985 dated Feb. 19, 1918, the mechanism comprises the usual platen shift rail 143 on which rides the roll 144 of the usual Underwood platen shift frame. Whenever the rail 143 is lifted so as to raise the platen to its upper case position, a pin 148 thereon swings a lever 145 pivoted between its ends at 146 so as to depress a throw-out arm 150 which disconnects the hooks 78 from the numeral keys. Said throw-out arm is pivoted on the post 149 to which the spring 132 is anchored, and includes a curved portion or cam which strikes the upper end of the yoke 138 whenever the platen is shifted, thus swinging the lever 116 to carry the hooks 78 clear of the numeral keys. This enables the operator to write the dollar mark in the computing zone, even though it may be in the upper case of a numeral key.

While in the embodiment of the invention disclosed, I have shown the master wheel of the computing mechanism as the traveling element, it is, of course, obvious that in some forms of the invention, the totalizer might be the traveling element. Therefore in claims where the word "master wheel" is used, it is to be understood that said claims are not necessarily limited to a master wheel traveling with the typewriter carriage, but said claims include any equivalent part which by its travel determines denominational selection.

Variations may be resorted to within the scope of the invention, and portions of the improvements may be used without others.

Having thus described my invention, I claim:

1. In a computing machine, the combination with numeral keys, computing wheels and a traveling carriage, of tabulating stops for positioning said carriage, a master wheel for actuating said computing wheels *seriatim*, and means controlled by the tabulating stops for simultaneously connecting said keys to said computing wheels and said master wheel to said carriage.

2. In a combined typewriting and computing machine, the combination with numeral keys, computing wheels and a traveling carriage, of tabulating stops for positioning said traveling carriage, a master wheel, and means controlled by certain of said tabulating stops, but not by others, for connecting said master wheel to said carriage, and said keys to said computing wheels.

3. In a combined typewriting and computing machine, the combination with a numeral key, a tabulating key and a master wheel, of stops coöperating with all three to determine how they shall be effective, stops coöperating with two, and stops cooperating with one.

4. In a combined typewriting and computing machine, the combination with a typewriter carriage, of a computing machine carriage, stops for connecting said carriages to intermittently travel together, means for returning said computing machine carriage to normal when not so connected, numeral keys, computing wheels, and means for connecting said keys to said wheels during only the time when said carriages are connected together.

5. In a combined typewriting and computing machine, the combination with a typewriter carriage, of a computing machine carriage, stops for connecting said carriages to intermittently travel together, numeral keys, computing wheels, and means for connecting said keys to said wheels during only the time when said carriages are connected together.

6. In a combined typewriting and computing machine, the combination with numeral keys, computing wheels and a typewriter carriage, of a computing device, a master wheel, means controlled by said carriage for connecting said master wheel and carriage during part of the travel of said carriage, and means for simultaneously connecting said computing device to said numeral keys.

7. In a combined typewriting and computing machine, the combination with numeral keys, computing wheels and a typewriter carriage, of tabulating stops for positioning said typewriter carriage, a computing machine carriage, and means controlled by certain of said tabulating stops for connecting said carriages to travel together and connecting said keys to said computing wheels.

8. The combination with a typewriter carriage and numeral keys, of a rack upon said carriage, typewriter tabulating stops mounted on said rack, certain of said stops having lugs, a latch or hook arranged to engage the lugs so as to travel with said carriage, means dependent upon the movement of the carriage for causing said hook to release the lugs in succession, a master wheel, a gang of computing wheels, means moved by said certain stops for connecting said keys to said master wheel, and means connected to said hook to effect a relative traveling movement between said master wheel and said gang of computing wheels.

9. The combination with a typewriter carriage and numeral keys, of a rack upon said carriage, column stops mounted on said rack, a device arranged to engage certain of said stops so as to travel with said carriage, means dependent upon the movement of the carriage for causing said device to release the stops, a master wheel, a gang of computing wheels, means connected to said device to effect a relative traveling movement between said master wheel and said computing wheels, and means controlled by said certain stops to connect said keys to said master wheel.

10. In a combined typewriting and computing machine, the combination, with a typewriter carriage, a set of numeral keys, and computing mechanism including a master wheel; of tabulating mechanism, including a rack mounted on said carriage, and a member carried by said rack; a device controlled by said member for connecting said master wheel with said carriage to travel therewith; and a separate device controlled by said member substantially simultaneously with the first-named device for connecting said keys with said computing mechanism.

11. In a combined typewriting and computing machine, the combination, with a typewriter carriage, a set of numeral keys, a master wheel, and a set of computing wheels; of automatic means for simultaneously connecting said master wheel with said carriage to travel therewith, and said keys with said computing wheels to govern the extent of rotation thereof, when the carriage enters a computing zone; said master wheel and said keys being automatically disconnectible simultaneously from said carriage and said computing wheels, respectively, when the carriage leaves said zone.

12. In a combined typewriting and computing machine, the combination, with a typewriter carriage, a set of numeral keys, a master wheel, and a set of computing wheels; of automatic means, dependent upon the travel of the carriage, for simultaneously connecting said keys with said computing wheels, and said master wheel with said carriage to travel therewith.

13. In a combined typewriting and computing machine, the combination, with a typewriter carriage, and a set of numeral keys; of a set of computing wheels; a master wheel for operating said computing wheels; a valuating mechanism for governing the extent of rotation of said computing wheels by said master wheel; and automatic means dependent upon the travel of the carriage for simultaneously connecting said master wheel to travel with said carriage, and said keys to control said valuating mechanism.

14. In a combined typewriting and computing machine, the combination, with a typewriter carriage, and a set of numeral keys; of a set of computing wheels; a master wheel for operating said computing wheels; means for connecting said master wheel to travel with said carriage; means for connecting said keys to control the extent of rotation of said computing wheels by said master wheel; and a single member on said carriage for operating both of said connecting means simultaneously.

15. In a combined typewriting and computing machine, the combination, with a typewriter carriage, and a set of numeral keys; of a set of computing wheels; a master wheel for operating said computing wheels; a valuating mechanism for governing the extent of rotation of said computing wheels by said master wheel; means for connecting said master wheel to travel with said carriage; means for connecting said keys to control said valuating mechanism; and a single member on said carriage for operating both of said connecting means simultaneously.

16. In a combined typewriting and computing machine, the combination with a cross-adding device, of a traveling carriage, numeral keys, and a stop settable on said carriage for positioning it and for connecting the numeral keys to the cross-adding device.

17. The combination with one or more computing units including a gang of computing wheels and a master wheel, of a carriage having a step-by-step movement, and also traveling to determine computing zones, indexing mechanism to determine the extent of rotation of the master wheel, numeral keys for controlling the action of the indexing mechanism; and a single element for concomitantly controlling the position of the carriage, the connecting of the master wheel to the carriage to cause *seriatim* engagement of the master wheel and computing wheels during the step-by-step movement of the carriage, and the connecting of the numeral keys to the indexing mechanism.

18. The combination with one or more computing units, of indexing mechanism for said computing units, numeral keys for controlling said indexing mechanism, denomination-selecting mechanism for said computing units, a traveling carriage, and tabulating mechanism for said carriage for determining the position thereof, said tabulating mechanism including an element acting at any position of the carriage to control the activity of said denomination-selecting mechanism and said keys.

19. In a combined typewriting and computing machine, the combination with typewriting mechanism including a carriage, computing mechanism, and numeral keys therefor, said computing mechanism having a traveling element normally disconnected from said carriage, of a device for preventing the simultaneous operation of more than one key, and means for connecting said traveling element of said computing mechanism with said carriage as said carriage enters a computing zone, and concomitantly putting said keys under control of said device.

20. In a combined typewriting and computing machine, the combination with typewriting mechanism including a carriage, computing mechanism, and numeral keys therefor, said computing mechanism having a traveling element normally disconnected from said carriage, of a tabulating stop for positioning said carriage, a device for preventing simultaneous operation of more than one key, and means controlled by said stop for connecting said traveling element of said computing mechanism to said carriage as said carriage enters a computing zone, and concomitantly putting said keys under control of said device.

GUSTAVE O. DEGENER.

Witnesses:
M. MEAD,
E. JAMISON.